Sept. 20, 1927.
W. E. RICHTER
1,643,258
CUSHIONED SPRING HANGER CONNECTION FOR AUTOMOBILE FRAMES
Filed April 12, 1924    2 Sheets-Sheet 1
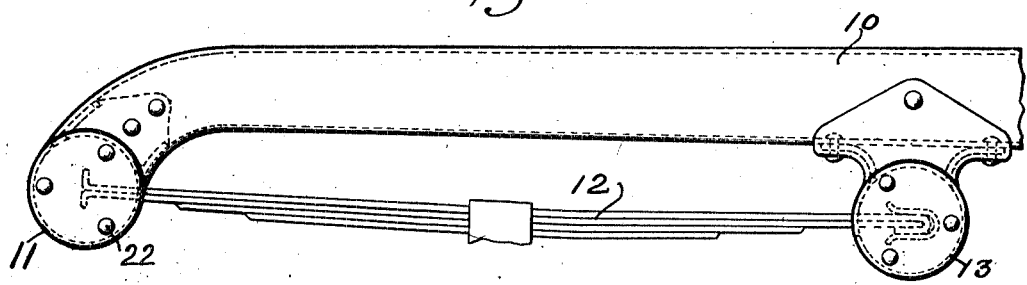
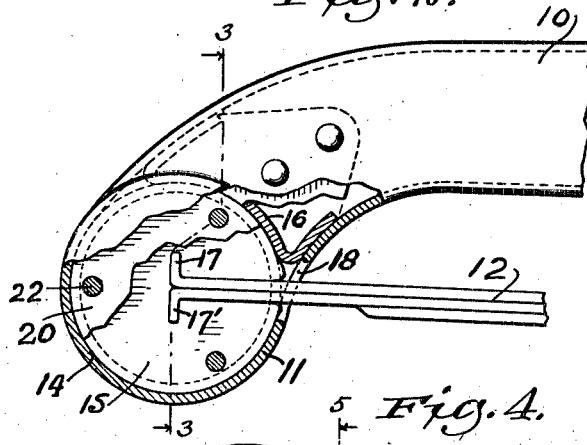
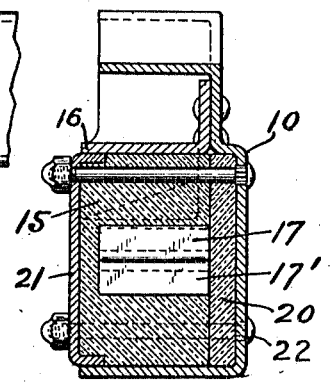
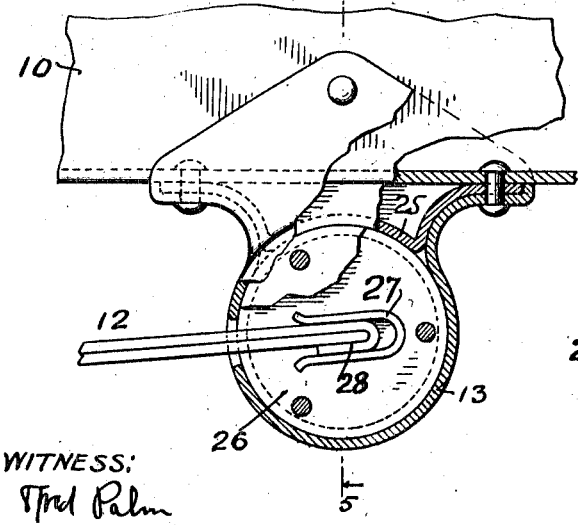
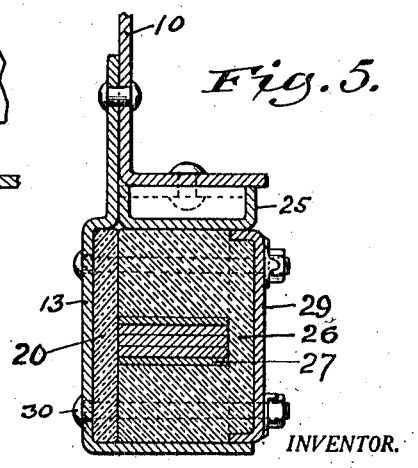
WITNESS:
Fred Palm
DEL.
INVENTOR.
W. E. Richter,
BY
Erwin, Wheeler & Woolard,
ATTORNEYS.

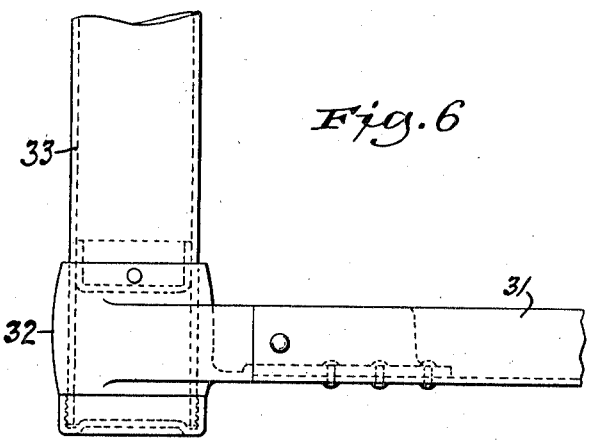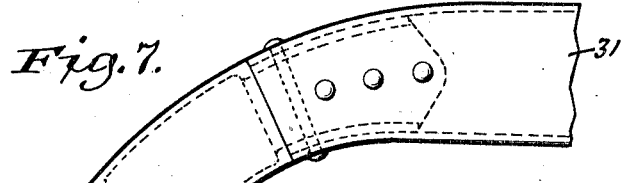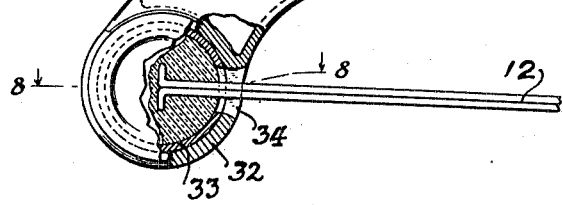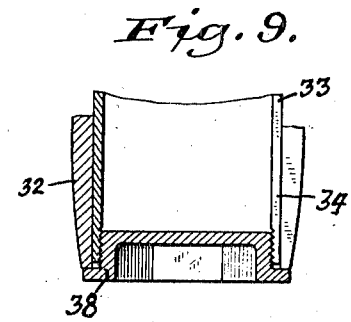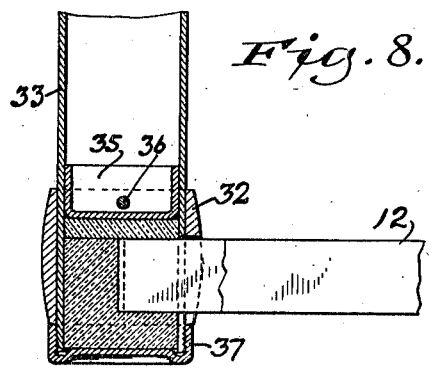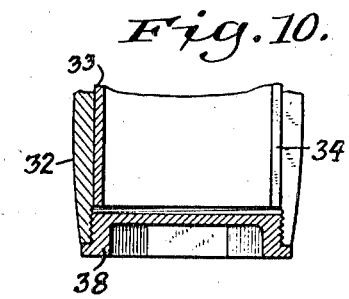

Patented Sept. 20, 1927.

1,643,258

UNITED STATES PATENT OFFICE.

WALTER E. RICHTER, OF WAUWATOSA, WISCONSIN, ASSIGNOR TO A. O. SMITH CORPORATION, OF MILWAUKEE, WISCONSIN, A CORPORATION OF NEW YORK.

CUSHIONED SPRING-HANGER CONNECTION FOR AUTOMOBILE FRAMES.

Application filed April 12, 1924. Serial No. 706,035.

My invention relates to an improvement in the construction of the spring hanger connections between the frame of an automobile and the supporting springs.

The purpose of the invention is to provide an improved construction of spring hangers in which metal-to-metal connections are avoided, so as to obviate the necessity for the usual lubrication of such connections. In such improved construction, the consequent wearing away of the connected parts, which so frequently occurs in the absence of efficient lubrication, in the older metal constructions is eliminated. The durability of the parts is consequently increased, and the discordant noises attendant upon the use of insufficiently lubricated metal connections are avoided. The improved connection is resilient in the degree required, and yet it possesses in the requisite degree such strength as will enable it to withstand all of the strains and shocks to which the automobile in which it is incorporated as a structural feature may be subjected while in operation.

Another purpose of the invention is to so construct and arrange the parts that the superior sprung weight of the frame and the elements supported thereon will be restrained from a relative longitudinal movement upon the running gear or lower unsprung weight, when the latter encounters adverse road conditions, whereby stability of the structure is maintained.

The details of my invention will now be pointed out and the novelty thereof will be set forth in the appended claims.

In the accompanying drawings:

Figure 1 is a view in elevation of one end of a side bar of an automobile frame, showing the supporting spring and the manner of its attachment to the side bar, in accordance with my invention.

Fig. 2 is an enlarged view of the extreme end of the side bar, parts being broken out and others being sectioned so as to afford a clear understanding of the structure involved.

Fig. 3 is a vertical section on the broken line 3—3, Fig. 2, looking in the direction of the arrows.

Fig. 4 is a view similar to Fig. 1, showing the complementary inner spring hanger.

Fig. 5 is a vertical section on the line 5—5, Fig. 4, looking in the direction of the arrows.

Fig. 6 is a plan view of a part of the forward end of an automobile frame, in which a tubular cross bar is employed for connecting the ends of the side bars of the frame together, and in which the spring hanger connection is otherwise the same as that shown in Fig. 2.

Fig. 7 is a view of the same parts in elevation, some of which are broken out and others of which are in section, in the interest of clearness.

Fig. 8 is a horizontal section on the line 8—8, Fig. 7, looking in the direction of the arrows, and showing the arrangement of the parts of Figs. 6 and 7.

Figs. 9 and 10 are like horizontal sectional views, illustrating modifications in the manner of applying caps to the end of the tubular cross bar shown in Fig. 8.

Referring to the drawings, the numeral 10 indicates an end portion of a channel side bar of an automobile frame, the said side bar being provided at its end with a spring hanger 11 of peculiar formation, for receiving the forward end of the supporting spring 12. The other end of the spring is received in a complementary hanger 13 permanently attached to the side bar.

The side bar is provided at its end with an integrally formed recess 14, constituting the forward spring hanger, for the reception of a cushioning block 15, produced from any desired material which will be resilient in the degree desired, and at the same time possess the necessary powers of resistance to strains and shocks. The circular form of the recess referred to is completed by the insertion of a plate 16 secured within the channel of the side bar and permanently attached thereto. In forming the side bar with the integral spring hanger at the end thereof, the sheet metal strip of which the side bar is formed is drawn into shape of a channel by turning up the side margins thereof, and at the same time turning up the end margin of the strip so as to form a wall at the end of the channel, thereby producing the spring hanger as an integral part of the side bar.

The ends of the spring co-acting with the forward spring hanger are upset as at 17 and 17', the projections thus formed extending in opposite directions from the horizontal plane of the supporting spring. A horizontal opening or slot 18 cut in the lower flange of the side bar, leads to the recess 14, and through this opening the end of the spring may be passed laterally when the connection is made to the side bar. The block of resilient material 15 may be formed or moulded about the flared end of the supporting spring, so as to embrace and insulate the latter on all sides. Or, the supporting block may be formed in sections, one of which is provided with a recess into which the flared end of the spring may be placed, and a covering piece 20 of like material, in the form of a disc, may be used to complete the enclosure of the end of the spring, and thereby effect complete insulation of the metal.

The constricted opening or slot 18, before referred to, and in which the spring may vibrate, is of less width than that of the enlargement formed by the extensions 17 and 17' so that the flared or enlarged end of the spring is held firmly within the recess 14 and can not be withdrawn therefrom by any longitudinal movement of the spring with relation to the side bar. This construction affords a very durable connection between the end of the springs and the frame supported thereon, and serves to prevent longitudinal movement of the frame and parts supported thereon with relation to the running gear of the automobile. The location of the spring with relation to the block 15 cannot therefore be disturbed, by reason of the engagement of the wider projections 17 and 17' with the resilient material, and the narrow opening in the hanger. The vertical front section of the flared end of the spring thus presents a widened surface which bears against the resilient material, such widened surface being of such an area as to resist the tendency of the end of the spring to cut the resilient material when force is applied, as by an end thrust upon the spring. The resilient material will yield slightly at such times, but its damage will be prevented. Likewise, if the wheels of the automobile encounter an obstruction, the forward movement of the frame with respect to the spring will be prevented by the widened surface upon the rear side of the said projection and the constricted opening 18 in the hanger.

After the cushioning block and the spring have been located in the forward end of the side bar in the manner described, the enclosure may be completed by a cap 21 applied to the opening of the recess and held in position by bolts 22 passing through the flange of the side bar and the said cap, as well as the cushioning material, the triangular arrangement of bolts shown being a preferable one.

In reducing my invention to practice, I proportion the parts which have just been described so that relatively longitudinal movement of the spring in the front hanger is effectively resisted, and so maintain a normal state in the fixed connection between the superposed parts and the running gear of the automobile. It occurs however, in the flexing of the supporting springs under the weight carried thereon, that such springs partake of a variable elongation. Such elongation of the spring does not disturb the normally fixed connection at the forward end of the spring, as has been described. But in connection with the rear or inner spring hanger, I provide a means which will permit such elongation without injury to the resilient material used in making the connection at that point. An inner spring hanger 13, complementary to the forward spring hanger 11, is secured to the side bar at a point intermediate its ends, such spring hanger being provided with a laterally opening circular recess similar to that shown in Fig. 2, for the reception of a cushioning block 26. A shoe 27, is embedded in the latter so as to receive the rear end of the spring, and yet allow the slight longitudinal extension in the length thereof which occurs when the spring is flexed by a load, or by reason of the vibration incurred by encountering a road obstruction. The projecting end of one of the leaves of the spring may be returned and made to embrace the end of the adjacent leaf, in the manner shown at 28, so that the end of the spring bears as a single element in the shoe 27. A disc 20 of resilient material is applied as before, and a cap 29 is secured by bolts 30 to complete the closure. The inner spring hanger 13 will be attached to the side bar in any suitable manner.

As before stated, the provision of the widened end of the supporting spring 12 permits a firm connection to be made with the outer end of the side bar, and prevents any relative longitudinal motion of the parts, while the form of the connection employed at the rear end of the spring is such as to permit flexing and elongation of the spring in the required degree under all conditions attending the use of the automobile.

In Figs. 6, 7 and 8 I have shown my improved connection as applied to a frame in which a tubular cross bar is employed to connect the side bars of the frame. The side bar 31 has attached thereto in permanent manner, a head 32 which is provided with an opening extending laterally through the same, the said opening receiving the end of the cross bar 33. Both the head 32 and the end of the cross bar 33 are laterally slotted as at 34 for the reception of the forward end of the spring 12. A plug or stop 35 is set inside of the cross bar, and the head 32, tubular cross bar 33, and block 35 are united by means of a pin 36 passed through the parts. The resilient, cushioning block is set in the socket thus formed, and receives the spring, in the manner previously described. The end of the cross bar may project slightly beyond the head 32 of the said frame, and be threaded for the reception of a screw cap 37, which completes the closure and retains the cushioning element in its proper position.

In Fig. 9, the cap 38 which completes the closure just described, may engage interiorly cut threads in the tubular cross bar 33, and in Fig. 10 the same element may engage interiorly cut threads in the head 32 of the side bar, for the same purpose. I propose to embellish the faces of the caps and plugs by impressing thereon the initial or other insignia of the automobile in which the construction is embodied.

I find it advantageous to confine the resilient, cushioning blocks connected to the ends of the springs, and thus avoid any undue shifting or working of such blocks under the pressures generated in the operation of the automobile. This is conveniently done in the manner illustrated, as by forming the cushioning blocks of a size which will cause them to fit snugly in and completely fill the recesses in the spring hangers. In such construction, a firm anchorage of the end of the spring with relation to the front spring hanger is effected, and relative longitudinal movement of the body upon the running gear is prevented. The recesses in the spring hangers may be of other contours than as shown, but in all of such constructions the shape of the cushioning block of resilient material will be changed to correspond, so that the latter will completely fill the recess, whatever may be its form. By anchoring the end of the spring in the manner described, and providing the widened or enlarged end thereof, the latter is restrained from relative movement in the said block, and consequently the latter is not damaged by end thrusts of the spring, as occurs in constructions not provided with the broadened bearing surfaces upon the spring.

In some constructions, wherein the supporting springs are substantially straight or but slightly curved, and their elongation is very slight, both ends of the spring may be formed and anchored in the manner illustrated in Figs. 2 and 3, thus dispensing with the form of connection shown in Figs. 4 and 5.

Having thus described my invention, what I claim and desire to secure by Letters Patent of the United States, is:

1. Means for connecting the sprung and unsprung weights in an automobile, such means comprising a supporting spring having an enlargement upon one end, a frame side bar provided integrally with a spring hanger in the form of a slotted socket in which the said enlargement is entered by lateral movement of the spring, a cushioning block of resilient material filling the socket and enclosing the said enlargement to form a non-metallic connection, and a connection between the other end of the spring and the side bar.

2. Means for connecting the sprung and unsprung weights in an automobile, such means comprising a supporting spring having an enlargement upon one end, a frame side bar provided integrally with a spring hanger in the form of a slotted socket in which the said enlargement is entered by lateral movement of the spring, a cushioning block of resilient material filling the socket and enclosing the said enlargement to form a non-metallic connection, and a second socketed spring hanger attached to the side bar and receiving a resilient cushioning block at the other end of the spring.

3. Means for connecting the sprung and unsprung weights in an automobile, such means comprising a supporting spring having an enlargement upon one end, a frame side bar provided integrally with a spring hanger in the form of a slotted socket in which the said enlargement is entered by lateral movement of the spring, the said slot being of less width than the said enlargement, a cushioning block of resilient material filling the socket and enclosing the said enlargement to form a non-metallic connection, and a connection between the other end of the spring and the side bar.

4. Means for connecting the sprung and unsprung weights in an automobile, such means comprising a supporting spring having an enlargement upon one end, a frame side bar provided integrally with a spring hanger in the form of a slotted socket in which the said enlargement is entered by lateral movement of the spring, the said slot being of less width than the said enlargement, a cushioning block of resilient material filling the socket and enclosing the said enlargement to form a non-metallic connection, and a second socketed spring hanger attached to the side bar and receiving a resilient cushioning block at the other end of the spring.

5. Means for connecting the sprung and unsprung weights in an automobile, such means comprising a supporting spring provided with an anchoring enlargement upon one end, a frame side bar provided integrally with a spring hanger formed as a socket with a relatively narrow slot into which the spring is passed laterally to enter the said enlargement in the socket, and a cushioning block of resilient material filling the said socket and enclosing the enlarged end of the spring, to constitute a non-metallic connection between the spring and side bar and prevent relative longitudinal movement of the parts so connected.

6. Means for connecting the sprung and unsprung weights in an automobile, such means comprising a supporting spring provided with an anchoring enlargement upon one end, a frame side bar provided integrally with a spring hanger formed as a socket with a relatively narrow slot into which the spring is passed laterally to enter the said enlargement in the socket, a cushioning block of resilient material filling the said socket and enclosing the enlarged end of the spring, to constitute a non-metallic connection between the spring and side bar and prevent relative longitudinal movement of the parts so connected, and a second socketed spring hanger attached to the side bar and receiving a resilient cushioning block at the other end of the spring.

7. Means for connecting the sprung and unsprung weights in an automobile, such means comprising a supporting spring provided with an anchoring enlargement upon one end, a frame side bar provided integrally with a spring hanger formed as a socket with a relatively narrow slot into which the spring is passed laterally to enter the said enlargement in the socket, a cushioning block of resilient material filling the said socket and enclosing the enlarged end of the spring, to constitute a non-metallic connection between the spring and side bar and prevent relative longitudinal movement of the parts so connected, and a second spring hanger attached to the side bar and supporting a resilient cushioning block including a metallic shoe for receiving the other end of the spring and permit elongation of the latter under vibrations incident to the operation of the automobile.

8. Means for connecting the sprung and unsprung weights in an automobile, such means comprising a supporting spring having an enlargement upon one end, a frame side bar with a lateral opening therethrough, a tubular cross bar disposed in the said opening and provided with a slot into which the spring may be passed laterally to enter the said enlargement in the tube, and a cushioning block of resilient material enclosing the enlargement on the end of the spring and arranged in the tube to constitute a non-metallic connection between the spring and the side bar.

9. A non-metallic connection between the sprung and unsprung weights of an automobile, the said connection comprising means formed integrally with the sprung weight for supporting a cushioning block of resilient material in fixed relation thereto, and means attached to the unsprung weight and engaging the said cushioning block to prevent longitudinal movement of the said weights with relation to each other.

In testimony whereof, I have signed my name at Milwaukee, Wisconsin this 9th day of April, 1924.

W. E. RICHTER.